G. W. HATFIELD.
Cultivator.
No. 61,828.
Patented Feb. 5, 1867.
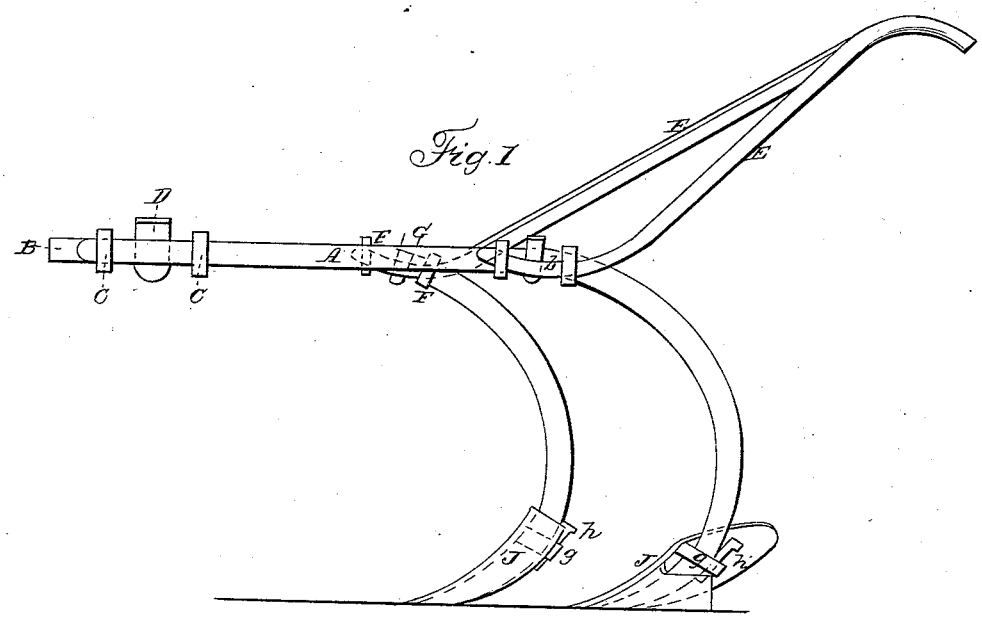
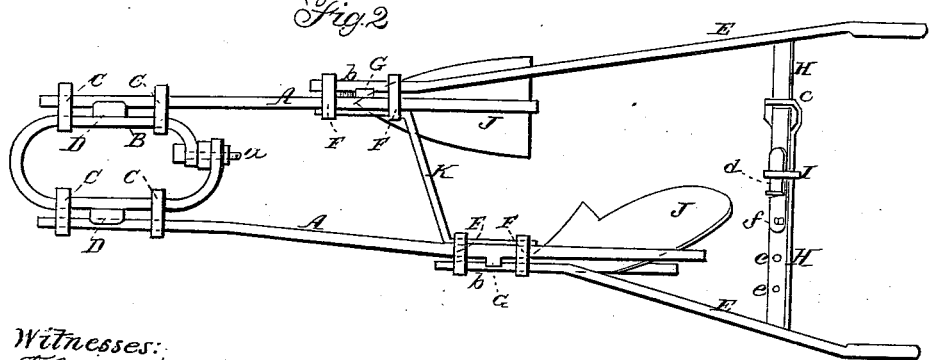
Witnesses:
Theo Fusch
J. A. Service
Inventor.
G. W. Hatfield
Per Munn & Co
Attorney

United States Patent Office.

GEORGE W. HATFIELD, OF HOLTON, INDIANA.

Letters Patent No. 61,828, dated February 5, 1867.

---

IMPROVEMENT IN CULTIVATOR PLOUGH.

---

The Schedule referred to in these Letters Patent and making part of the same.

---

TO ALL WHOM IT MAY CONCERN:

Be it known that I, GEORGE W. HATFIELD, of Holton, in the county of Ripley, and State of Indiana, have invented a new and improved Cultivator Plough; and I do hereby declare that the following is a full, clear, and exact description thereof, which will enable others skilled in the art to make and use the same, reference being had to the accompanying drawings, forming a part of this specification, in which—

Figure 1 is a side view of my invention.

Figure 2 is a plan or top view of the same.

Similar letters of reference indicate like parts.

This invention relates to a new and improved cultivator plough, and it consists in a novel construction of the same, as hereinafter fully shown and described, whereby the implement is rendered capable of being adapted to various kinds of work, and by a very simple adjustment of parts.

The beams and standards A A are of iron, and formed out of one piece bent or curved, as shown clearly in fig. 1. They are formed out of rectangular bars of iron or steel—iron will probably be most generally used. The front ends of the beams are connected together by a metal loop, B, composed of an iron bar bent in oval form, and having its ends connected together by a bolt, a, as shown clearly in fig. 2. On this loop B metal clips, c, are placed, and these clips are fitted on the front parts of the beams, the beams and loop being firmly retained or held in position by keys or wedges, D, which are driven down between the loop and the beams A A. E E represent the handles constructed of iron bars, and having their front ends b curved, as shown clearly in fig. 1. These curved ends b are secured to the beams A by clips F F which encompass the beams, and the curved ends b of the handles and keys G are driven between the beams A and the curved ends b of the handles. By this arrangement it will be seen that the outer ends of the handles may be adjusted higher or lower to suit the height of the attendant or ploughman, by simply loosening the keys G and adjusting the handles more or less forward. The handles E E are connected near their outer ends by two bars, H H, one of which is formed with an eye, e, for the other bar to pass through, and the inner ends of the two bars are lapped and have a clip, I, fitted on them with a key or wedge, d, driven within it, as shown clearly in fig. 2, and one of said bars may be perforated with holes, e, to receive a pin, f, projecting from the other bar. From the above description it will be seen that by using loops B of different sizes or widths, the beams A A may be adjusted at a greater or less distance apart, as desired to suit the width of the spaces between the rows of plates, and by lapping the bars H H more or less the handles E E may be adjusted to correspond to the position of the beams A A. Thus by this simple arrangement the implement may be adapted to various kinds of work, either garden or field culture. On the curved or standard parts of the beams ploughs J J' are secured. The lower parts of these standards are of taper form, and they pass through eyes, g, secured to the rear sides of the ploughs, and keys h are driven within the eyes, between their outer ends and the standards, as shown clearly in fig. 1. By this means the ploughs are firmly secured to the standards. These ploughs may be of different forms or shapes, according to the character of the work to be performed. For ordinary field cultivators, the first ploughing, where it is required to throw the earth from the plants, the plough J may be of such a form as to throw the earth therefrom, and the plough J' to cast it back again, thereby thoroughly pulverizing the earth. K is a brace with its ends bent in opposite direction, as seen in fig. 2 of the drawing, attached to the inner sides of the plough beams A A and secured thereto by means of the clips F F, and serves to strengthen and steady the plough beams.

Having thus described my invention, I claim as new, and desire to secure by Letters Patent—

1. The loop B, clips C, and keys or wedges D, all arranged to secure the front ends of the beams A together, substantially as and for the purpose herein set forth.

2. The beams A A, handles E E, brace K, held together by the clips F F, and key G, when all are combined and arranged as herein set forth.

GEORGE W. HATFIELD.

Witnesses:
JAMES DUNCAN,
STEPHEN W. BRUCE.